(No Model.) 6 Sheets—Sheet 1.

C. L. TRAVIS.
MATRIX MAKING MACHINE.

No. 496,373. Patented Apr. 25, 1893.

Fig. 1.

Attest:
Sidney P. Hollingsworth
W. A. Kennedy.

Inventor:
C. L. Travis
By Phil T. Dodge
Atty (No Model.) 6 Sheets—Sheet 2.
C. L. TRAVIS.
MATRIX MAKING MACHINE.

No. 496,373. Patented Apr. 25, 1893.

Attest:
Sidney P. Hollingsworth
N. A. Kennedy.

Inventor:
C. L. Travis.
By his atty
Phil T. Dodge (No Model.) 6 Sheets—Sheet 3.
C. L. TRAVIS.
MATRIX MAKING MACHINE.

No. 496,373. Patented Apr. 25, 1893.

Attest:
Sidney P. Hollingsworth
N. R. Kennedy

Inventor:
C. L. Travis
By his atty
Phil T. Dodge

(No Model.) 6 Sheets—Sheet 4.
C. L. TRAVIS.
MATRIX MAKING MACHINE.

No. 496,373. Patented Apr. 25, 1893.

Attest:
Sidney P. Hollingsworth
N. A. Kennedy

Inventor:
C. L. Travis
By his Atty
Phil. T. Dodge (No Model.) 6 Sheets—Sheet 5.
C. L. TRAVIS.
MATRIX MAKING MACHINE.

No. 496,373. Patented Apr. 25, 1893.

Inventor:
C. L. Travis
By his Atty
Phil. T. Dodge

Attest:
Sidney P. Hollingsworth
N. A. Kennedy (No Model.)  6 Sheets—Sheet 6.

C. L. TRAVIS.
MATRIX MAKING MACHINE.

No. 496,373. Patented Apr. 25, 1893.

Fig. 22.

UNITED STATES PATENT OFFICE.

CHARLES L. TRAVIS, OF MINNEAPOLIS, MINNESOTA, ASSIGNOR TO THE MINNEAPOLIS ELECTRO MATRIX COMPANY, OF SAME PLACE.

MATRIX-MAKING MACHINE.

SPECIFICATION forming part of Letters Patent No. 496,373, dated April 25, 1893.

Application filed January 29, 1889. Serial No. 297,981. (No model.)

*To all whom it may concern:*

Be it known that I, CHARLES L. TRAVIS, of Minneapolis, in the county of Hennepin and State of Minnesota, have invented certain Improvements in Matrix-Making Machines, of which the following is a specification.

This invention has reference to an electrically-actuated machine for successively indenting and properly spacing the letters or characters in a sheet of paste-board or like material in the order in which they are to be printed and in parallel lines.

It relates more particularly to improvements in machines of the character represented in the patents to Goodson, Nos. 414,399 and 414,400, dated November 5, 1889.

The aims of the invention are mainly to cheapen the construction, to increase the operative speed, to secure more accurate feeding of the sheet, to permit the ready change from one style of type to another, to permit the ready insertion of characters at any desired points in the previously formed matrix, and to facilitate the grouping of the characters in tabular form.

It is to be understood that in all particulars not hereinafter specifically described, the machine may be constructed and operated in the same manner as the Goodson machines above referred to, and in view of this fact I have limited my specification as far as possible to those matters to which my invention directly pertains.

In the accompanying drawings, Fig. 7 is a perspective view showing a part of the circuit-closing mechanism. Fig. 8 is a bottom plan view of a portion of the feed mechanism. Fig. 8$^a$ is a plan view of a portion of the feed mechanism. Fig. 8$^b$ is a detail view of one of the feed-controlling magnets and its connections. Fig. 9 is a plan view showing the same with the parts in a different position.

Figure 1:
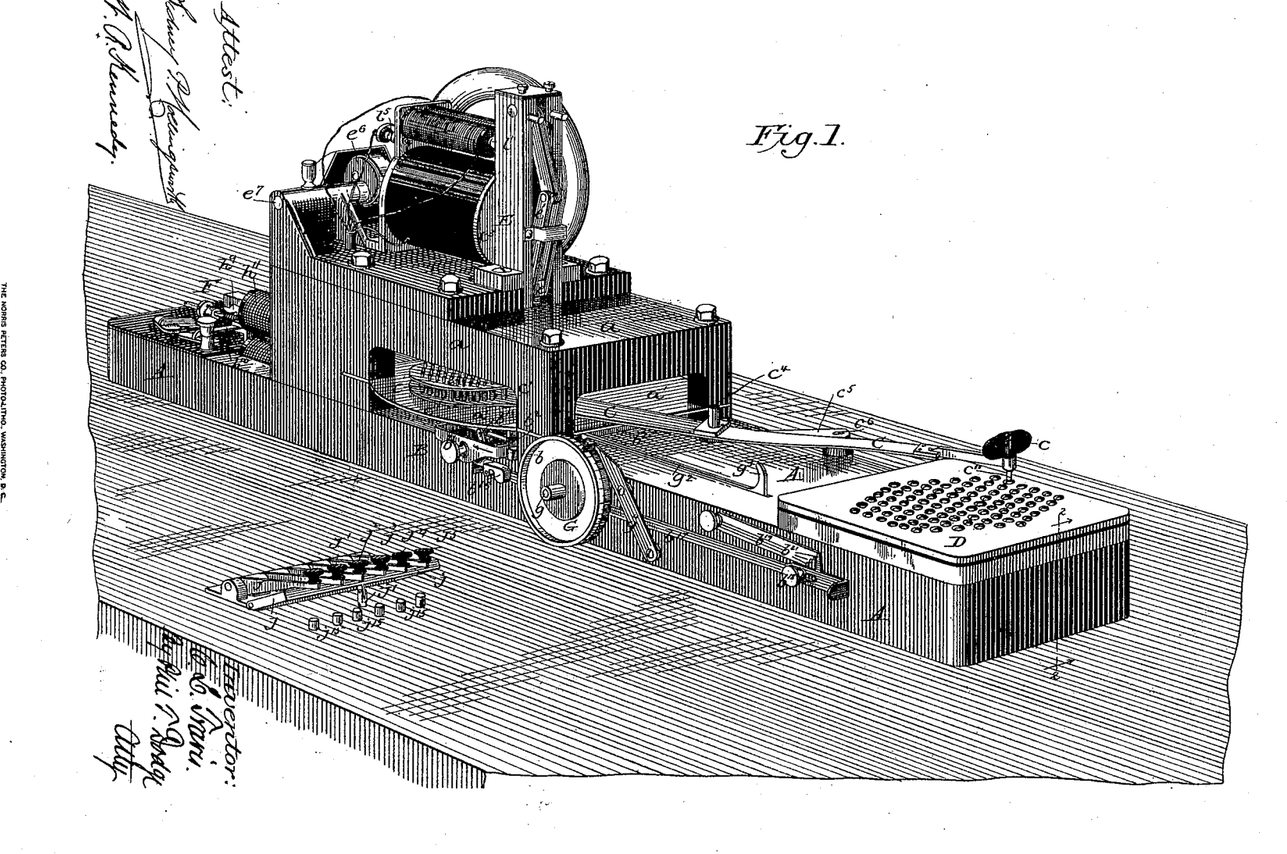
—Figure 1 is a perspective view of a machine containing my improvements.
Figures 2, 3:
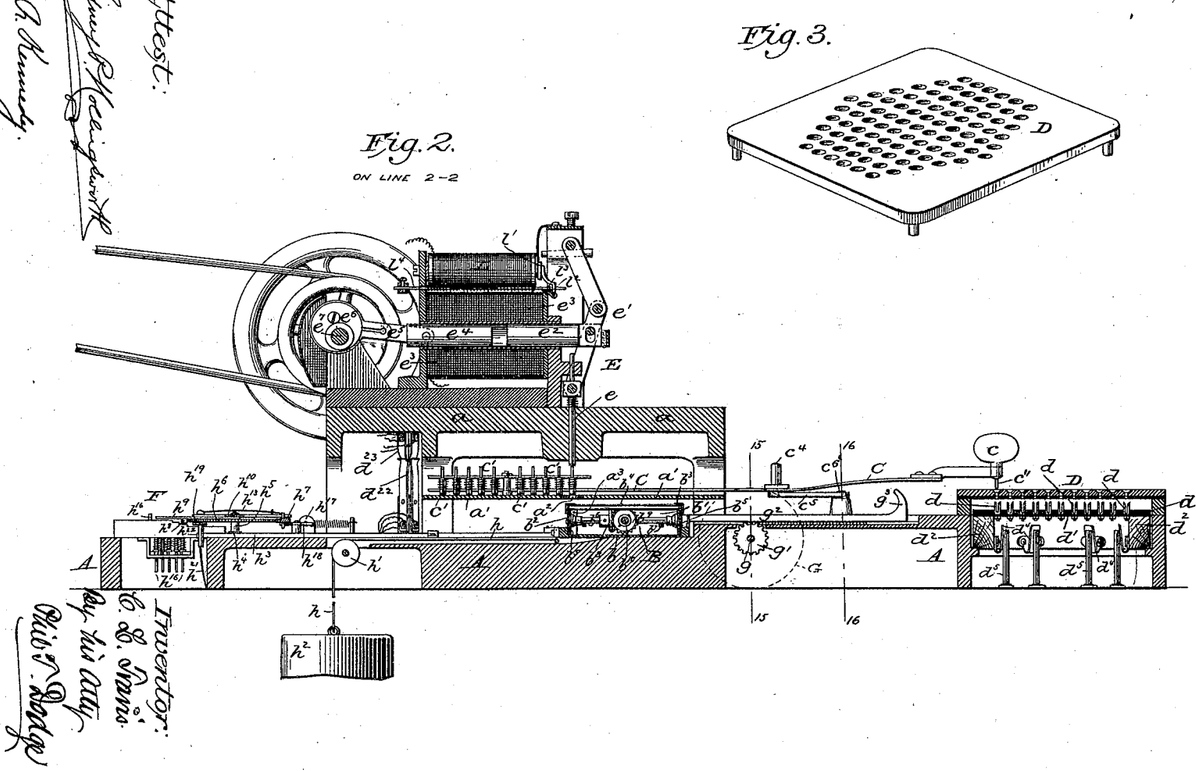
Fig. 2 is a longitudinal vertical central section of the same on the line 2—2.
Fig. 3 is a perspective view of the removable plate through which the circuit connections are made.

Referring to the drawings, A represents the bed or base-plate fixed upon a table or other suitable support, and provided midway of its length with a top-frame, $a$, sustained thereon by legs or corner pieces, as shown in Figs. 1 and 2, so as to leave a horizontal open space between the bed and top-frame. In this space supported by the top-frame, is a fixed horizontal plate $a'$, having therethrough, as shown in Fig. 2, a vertical opening, $a^2$, directly over the printing or impression point, and over a rigid anvil or impression post, $a^3$.

Upon the bed-plate and under the plate $a'$, is mounted a carriage, B, to support a sheet of paper, papier maché, or other material of which matrix is to be formed, above the top of the anvil $a^3$. This carriage is constructed and combined with operating devices in such manner that it carries the paper beneath the opening $a^2$, in the proper manner to cause the type acting therethrough to form their impressions in successive parallel lines.

C represents a lever having a horizontal motion in all directions, provided at one end with a finger piece, $c$, and at the opposite end with guides supporting independent vertically-movable type $c'$, each encircled by a helical lifting spring.

D represents a perforated plate or keyboard, fixed in position under the outer end of the lever, and provided with numerous holes adapted to receive the point of the finger-piece. These holes correspond in number and arrangement with the type at the opposite end of the lever, and are preferably marked with corresponding characters, so that the act of bringing the finger piece into coincidence with a hole representing any particular letter of the key-board, brings the corresponding type at the other end of the lever directly over the hole $a^2$, in order that it may be driven therethrough to produce an impression or indentation in the paper below.

For the purpose of driving the type which is for the moment in printing position downward through the hole $a^2$, I provide an impression mechanism, E, having as its essential features the vertically-guided striker $e$, the toggle-joint $e'$, connected to the striker to effect its depression, and an armature, $e^2$, connected to the toggle-lever, and reciprocating within a helix, $e^3$, which contains a reciprocating soft iron core, $e^4$, actuated by a pitman, $e^5$, from an eccentric, $e^6$, on a shaft $e^7$, driven from an external motor of any suitable character. When an electric current is passed through the helix the core $e^4$, becomes magnetized, and attracting the armature $e^2$, causes the latter to actuate the toggle and effect the impression.

A feed mechanism, F, located at the rear end of the machine, serves to secure the advance of the carriage step by step after the impression of the successive characters.

Circuit controlling devices, hereinafter described in detail, lead from the impression mechanism E, and from the feed mechanism F, to contact pieces $d$ in a plate, $d'$, under the key-board. The point $c''$, on the finger-lever may be depressed through any one of the holes in the key-board so as to encounter the corresponding contact piece below, and thereby complete the circuit so as to cause the action of the feed and the impression devices.

In their general construction and mode of operation the foregoing parts are similar to those described in the patents above referred to, the horizontal movement of the finger-lever bringing the required type to the printing point, and the depression of the lever closing the circuits to cause the impression and the advance of the paper.

Having now described the general construction of the machine, which I do not claim, I will proceed to describe in detail the features constituting the subject-matter of the present invention.

The finger-lever C instead of being pivoted, as in the former machine, on a reciprocating slide, is now mounted on a vertical stud, $c^4$, on one end of a horizontal arm, $c^5$, sustained at one side of the bed-plate by a vertical journal $c^6$. By this arrangement I avoid much of the expense and friction attending the original construction, and permit the lever C, to move with more freedom.

Figure 12:
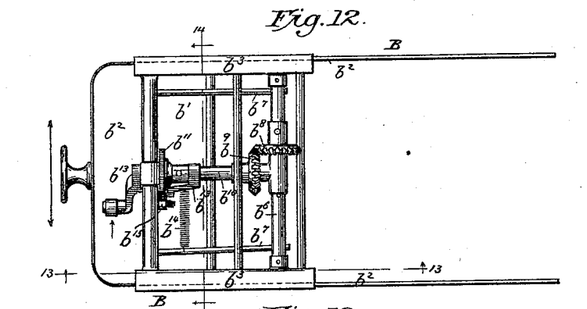
Fig. 12 is a top plan view of the removable portion of the paper carriage.
Figure 13:
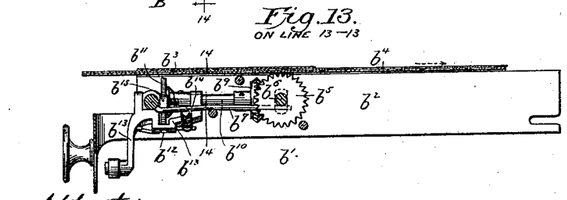
Fig. 13 is a longitudinal vertical section of the same on the line 13—13.
Figure 14:
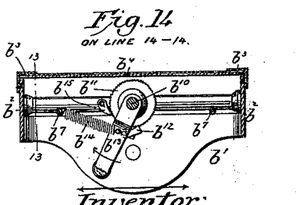
Fig. 14 is a cross section of the same on the line 14—14.
Figure 15:
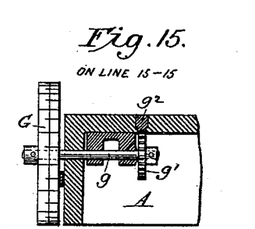
Fig. 15 is a cross-section on the line 15—15, Fig. 4.
Figure 16:
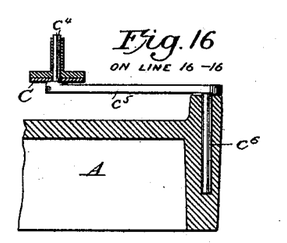
Fig. 16 is a view on the line 16—16 of Fig. 4.
Figure 17:
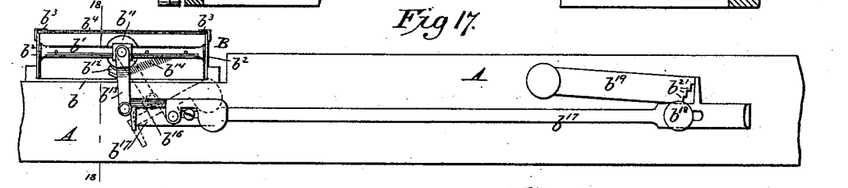
Fig. 17 is a side elevation of a portion of the bed or base-plate showing the adjustable feed mechanism.
Figure 18:
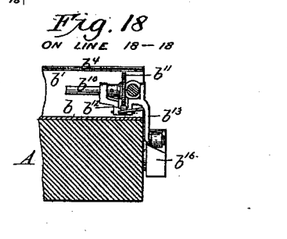
Fig. 18 is a cross section on the line 18—18 of the preceding figure.
Figure 19:
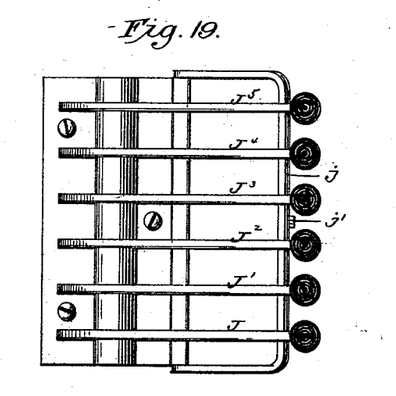
Fig. 19 is a top plan view of the spacing key mechanism.
Figure 20:
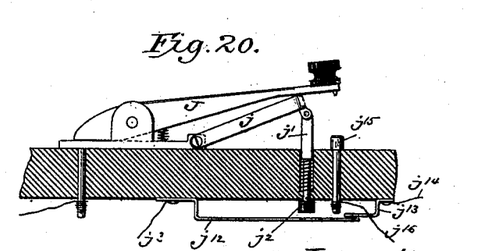
Fig. 20 is a side elevation of the same.

My next improvement relates to the construction of the paper carriage, and has in view the more accurate feeding of the paper, and an adjustment of the feed to vary the distance between the lines. The carriage consists, as in the former machine, of a base portion, $b$, mounted permanently on the bed-plate to move step by step in the direction of the length of the line, and of an upper removable portion, $b'$, shown in Figs. 12, 13 and 14, designed to support the paper and to advance the same thereon after the completion of each line the proper distance to secure the printing of the next line. The upper part or paper holder $b'$ consists, as shown in Figs. 12, 13 and 14, of a U-shaped frame, $b^2$, having along its two sides overlying lips $b^3$, to confine the edges of the paper sheet $b^4$, which are inserted therein. It is necessary to slide this sheet endwise on the support as the successive lines are printed. This is effected by two underlying toothed wheels, $b^5$, mounted on a transverse shaft, $b^6$, the ends of which are mounted in slots in the sides of the frame $b^2$, and urged upward by spring arms $b^7$. This arrangement causes the teeth of the wheel to engage firmly in the under side of the sheet, and admits of sheets of different thicknesses being employed without affecting the feed. The intermitting rotation of the shaft $b^6$, is effected by the miter wheel $b^8$, mounted thereon and moved by a wheel, $b^9$, driven by a shaft, $b^{10}$. On the rear end of this shaft is fixed a rigid wheel, $b^{11}$, engaged by a pawl, $b^{12}$, on the vibratory arm $b^{13}$, mounted loosely on the shaft. A spring, $b^{14}$, serves to retract the arm and pawl, and a fixed pawl, $b^{15}$, prevents retrograde motion of the wheel. The arm $b^{13}$, is actuated in the manner to be presently described, by a dog $b^{16}$, pivoted to the longitudinally adjustable bar $b$, on the side of the bed-plate. The entire paper support, $b'$, of Figs. 12, 13 and 14, is pushed endwise to its place in the base portion of the carriage, and remains immovably in position therein. The carriage as a whole reciprocates in the direction of the length of the lines as indicated by the arrows in Figs. 1, 4, 12 and 14. Its movement to the left occurs step by step, and during this movement the feed devices on the carriage remain at rest. When, however, the carriage is returned to the right previous to the commencement of a new line, the arm $b^{13}$, preferably provided with an anti-friction roller as shown, encounters the end of the dog $b^{16}$, so that as the carriage completes its movement the dog causes the arm to swing in the direction indicated by the arrow in Figs. 12 and 14; thereby turning the toothed wheels $b^5$, and causing the paper to be advanced in the carriage in the direction indicated by the dotted arrow in Fig. 13. As the upper or paper-supporting part of the carriage requires to be frequently withdrawn from and returned to the machine, to continue printing at the point at which it ceased, it is necessary to prevent the dog $b^{16}$, from operating the arm $b^{13}$, as the upper part of the carriage is returned to its place. To this end I bevel the forward end of the dog $b^{16}$, laterally, as shown in Figs. 1 and 18, and mount it on a horizontal pivot, giving its rear end a preponderance of weight. If, therefore, the arm $b^{13}$, encounters the dog from the side, it will ride upon the beveled face, as shown in full lines in Fig. 18, and dotted lines in Fig. 17, causing the dog to tip downward for the moment out of position so as to leave the arm $b^{13}$, in its former position, so that the paper will be presented in the position which it occupied before the upper part of the carriage was removed from the machine.

Another important feature of my invention lies in the means for changing at will the distance which the paper is advanced on the carriage by the devices just described. This is effected by mounting the dog $b^{16}$, on one end of the before mentioned bar, $b^{17}$, arranged to slide endwise on the side of the base-plate, and secured by a set-screw $b^{18}$, passing through a slot therein. By means of this bar the dog may be shifted horizontally so as to encounter the arm $b^{13}$, at an earlier or later period of the retreat of the carriage. As the carriage always retreats to and stops at the same point, it follows that the movement of the arm $b^{13}$ and the advance of the paper is varied by changing the position of the dog.

Figure 4:
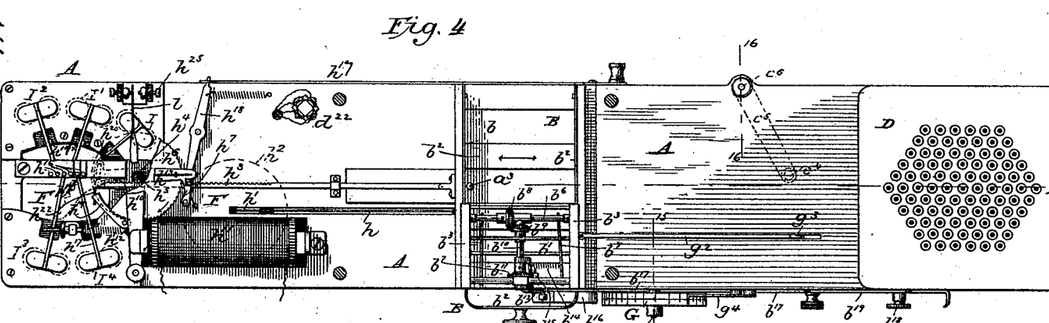
Fig. 4 is a top plan view with the motor and impression mechanism removed and other parts broken away.
Figure 5:
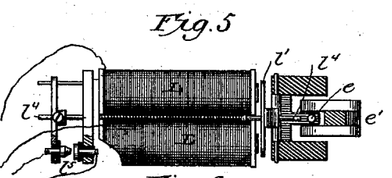
Fig. 5 is a top plan view showing a portion of the impression mechanism and its circuit connections.
Figure 6:
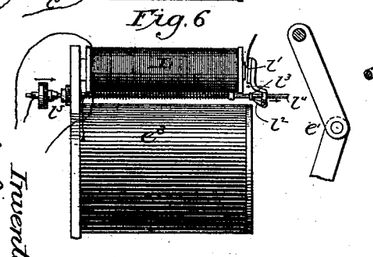
Fig. 6 is a side elevation of the same.

In practice it is found advisable to employ only three or four different widths of spacing between the lines. In order that the machine may be adjusted quickly for any one of these spacings, I pivot to the side of the bed-frame a dog, $b^{19}$, having on its end a series of shoulders $b^{21}$, to abut against a projection on the bar $b^{17}$. By seating this projection against one or the other of the shoulders, the operator is enabled accurately to adjust the parts for the required spacing. The outer end of the base portion $b^2$, is extended outward around the feed-operating lever as shown in Figs. 1 and 4, and serves both as a guard to prevent accidental movement of the parts when the paper-sustaining portion is removed and also has a handle by which to remove the same.

Another feature of my improvements relates to an indicator to show the position of the successive characters as they are printed in each line, and the blank or unprinted space remaining in the line, and this for the purpose of enabling the operator conveniently to arrange the matter in tabular or other required form, and to insert missing characters or different characters at the exact points desired. This indicator is plainly shown in Figs. 1, 2, 4 and 15, in which G represents the indicator wheel carried on one end of a horizontal shaft, $g$, which is mounted in the bed-plate and provided with a pinion, $g'$, engaging a rack-bar, $g^2$. This rack-bar is mounted to slide in a groove in the bed-plate, and is connected at one end to the carriage and provided at the other end with an upturned finger-piece, $g^3$, by means of which it may be drawn backward to retract the carriage after the completion of each line. As the carriage advances it communicates motion through the rack-bar and intermediate parts to the indicator wheel causing the latter to turn forward step by step. The wheel is provided on the periphery with suitable graduations which are read in connection with a stationary pointer, $g^4$, fixed to the side of the frame. By observing the position of the pointer with reference to the graduations, which are constantly in view, the operator is enabled to determine the exact position in the line of the character last printed, and also the space remaining in the line to be filled.

Figures 7, 8, 8A, 8B, 9:
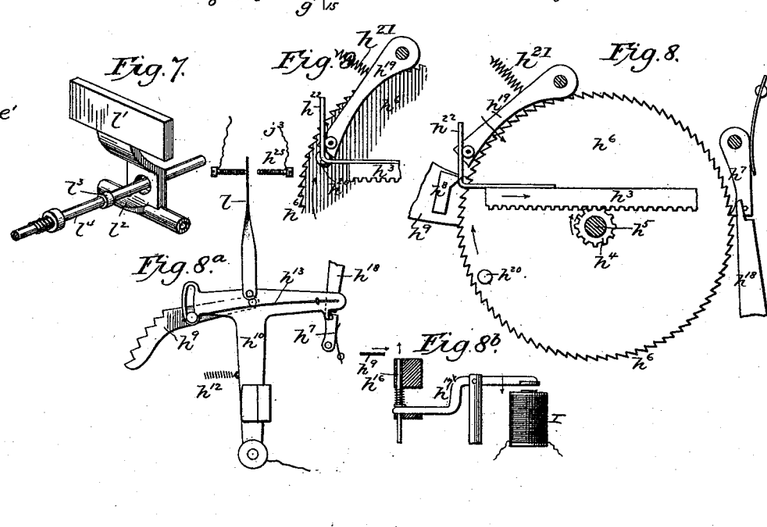
Figure 10:
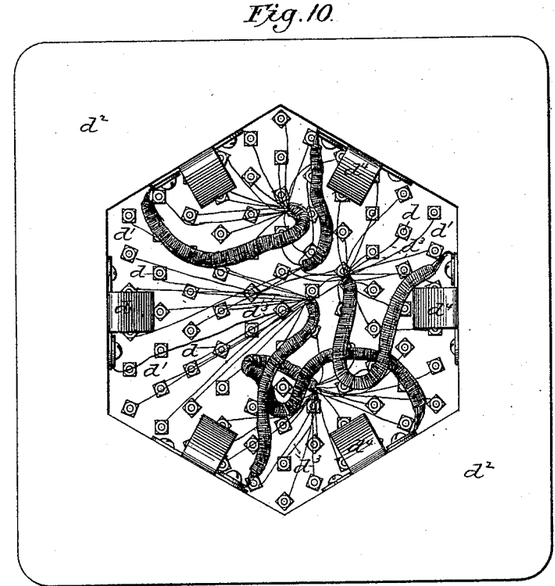
Fig. 10 is a bottom plan view of the key-board and the circuit-closing devices therein.

The feed mechanism of the carriage, represented throughout by the letter $h$, in its different powers, is plainly shown in Figs. 2, 4, 8 and 9. The advance of the carriage is effected by a cord, $h$, attached thereto passed downward over a guide-pulley, $h'$, provided at the lower end with a weight, $h^2$. The advance I check by means of a rack-bar, $h^3$, fastened to the carriage, and engaging a pinion, $h^4$, on a vertical shaft, $h^5$, which shaft also carries the ratchet-wheel, $h^6$, hereinafter designated for convenience of reference as the "feed-wheel." The weight tends through the rack-bar to turn the feed-wheel in the direction indicated by the arrow in Fig. 4. This rotation is controlled and the advance of the carriage limited by means of a fixed pawl, $h^7$, and a tooth, $h^8$, (see Fig. 8,) which engage alternately. The pawl is mounted on a fixed pivot and urged into engagement by a spring. The stop-tooth $h^8$, is on one end of a lever, $h^9$, pivoted to one end of an armature-lever, $h^{10}$, in the field of an electro-magnet, $h^{11}$. A spring, $h^{12}$, urges the armature-lever away from the magnet carrying with it the lever $h^9$, so that its stud $h^8$, stands out of engagement with the feed-wheel as shown in Fig. 8. A spring, $h^{13}$, urges the stop-lever $h^9$, when thus disengaged from the wheel, backward to the position shown in Figs. 8 and 8$^a$. When the armature lever $h^{10}$, is attracted by the magnet it acts to disengage the pawl $h^7$, thereby allowing the feed wheel to turn forward. At the same time, the armature lever carries the lever $h^9$ endwise, engaging its tooth $h^8$, in the feed-wheel, whereupon the wheel revolves, overcoming the spring $h^{13}$, and carrying the lever $h^9$, forward until the machine is stopped by the lever $h^9$, encountering one or another of a series of stop pins, $h^{16}$, carried by the armatures hereinafter described. The play of the lever $h^9$, in relation to the armature lever, $h^{10}$, is limited by a pin and slot as shown in Fig. 8$^a$. Its end is notched or shouldered, as shown in Fig. 8$^a$, so that the extent of its advance and, consequently, the advance of the feed-wheel and carriage depends upon which of the stop pins $h^{16}$ is lifted into position to arrest its motion. The action of these parts is essentially the same as in the original machine.

One of my present improvements consists in the means for throwing the feed mechanism out of action at will so that the carriage may be allowed to run forward as the special arrangement of matter upon the page or sheet may demand. To this end I mount on the side of the bed-plate opposite the bar $b^{17}$ a sliding-bar, $h^{17}$, movable at the will of the operator, connected at one end to a lever, $h^{18}$, which is pivoted to the bed-plate and arranged to engage the pawl or dog $h^7$, for the purpose of throwing the same out of action and thereby release the feed wheel. When the parts are thus unlocked it is necessary for the operator to control the forward motion of the carriage by hand, which is readily effected by grasping the handle $g^3$, before referred to.

Another of my improvements relates to a means to prevent the carriage from being retracted too far and to prevent injury to the feed mechanism in the event of the carriage being drawn violently backward. To this end I pivot to the bed plate as in Figs. 4, 8 and 9, a dog, or stop $h^{19}$, intended to engage a stop-pin $h^{20}$ on the under side of the feed wheel $h^6$, so as to limit the backward rotation of the wheel. A spring, $h^{21}$, of any suitable form, holds this dog normally out of engagement. An arm, $h^{22}$, attached to the end of the rack-bar $h^3$, encounters the dog $h^{19}$, as the carriage completes its backward movement, thereby throwing the dog from its normal position shown in Fig. 8 to the position shown in Fig. 9, so that it will check the rotation of the wheel. As the carriage advances the rack-bar carries its arm $h^{22}$, away from the dog allowing the latter to swing out of the path of the stud so that the feed-wheel may make repeated revolutions during the advance of the carriage.

Figure 11:
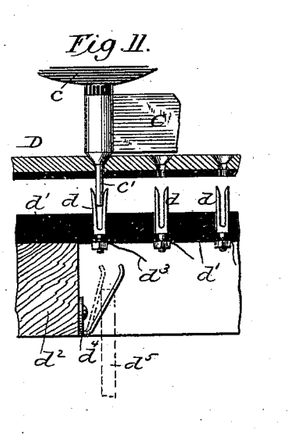
Fig. 11 is a vertical section through the key-board and one end of the circuit-closing lever.

I will now refer to the key-board and the circuit connections thereunder. Below each of the holes in the key-board there is a contact piece, $d$, through which the circuit is completed to the appropriate spacing and impression devices substantially as in the original machine. Instead of constructing these contact pieces as in the original machine I now make each one of a U-form, providing it at the lower end with a neck screwed into and through the supporting plate $d'$, of non-conducting material. The upper forked end is presented immediately below the corresponding opening in the key-board, so that when the end of the finger-lever is depressed its conducting point $c^{11}$, will be wedged between the two arms of the corresponding piece $d$, as in Fig. 11, the frictional sliding contact thus secured insuring the completion of the circuit. The plate $d'$ is secured to a marginal supporting frame, $d^2$, (see Fig. 2,) and is removable at will therewith from the bed-plate in which it is seated, the overlying key-board D, which is seated loosely in place, being first removed, and this for purposes which will presently appear.

In the present machine as in the original the characters and spaces are divided into several groups, those of each group having the same width. The spacing mechanism embraces a distinct magnet for the letters and spaces of each group. At the key-board all the contact pieces $d$, which represent letters of the same width, are connected by conducting wires $d^3$, to a single conducting-plate, $d^4$. The several conducting plates, representing the several groups of characters, are of elastic material and secured to the marginal frame $d^2$. When the parts are in operative position the plates bear respectively against rigid conducting posts $d^5$, as shown in Fig. 2, through which the several circuits are completed. It will be observed that the arrangement is such as to permit the free removal and replacement of the plate $d'$; and that when it is returned to its place the spring conductors automatically make contact with the posts.

The capability of removal on the part of the plate $d'$, and the contact devices is a matter of great advantage in that it permits the machine to be readily changed or converted from the use of one kind or style of type to another. The type of different languages, and type of the same language in different fonts or styles, differ from each other in the relative widths representing the characters. In my machine I am enabled to replace the plate $d'$ by another having its characters differently grouped as their widths may require. Thus I am enabled to provide for feeding or spacing by simply changing from one plate to another.

The extent of motion and the spacing of the devices is limited, it will be remembered, by the stop-pins, $h^{16}$, operated by the armature levers $h^{17\times}$ of the spacing-magnets I I' I² I³ and I⁴. The circuits from the respective posts $d^5$, are completed through the main feed magnet $h^{11}$, and the respective magnets I I', &c., as in the original machine, so that when the finger-lever closes the circuit at the key-board the magnet $h^{11}$ will cause the action of the feed mechanism, and also the action of one or another of the magnets I I', &c., thereby causing the advance of the carriage a greater or less distance according to the group in which the character to be printed belongs.

Figure 21:
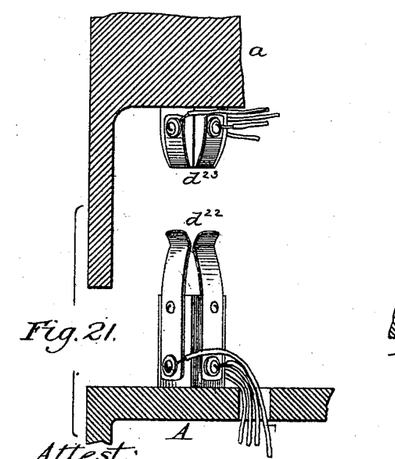
Fig. 21 is a vertical section showing the separable circuit connections between the parts of the main-frame.
Figure 22:
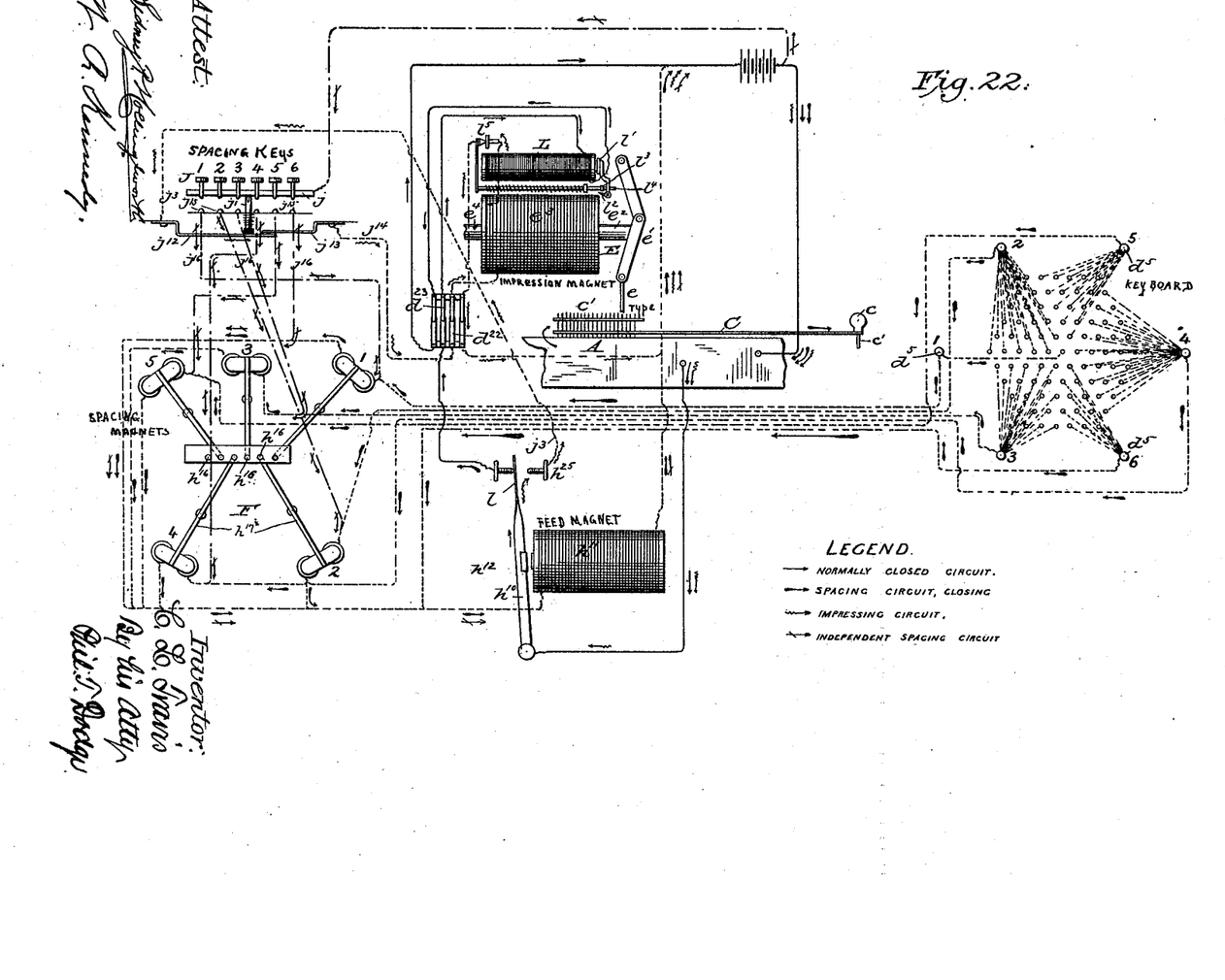
Fig. 22 is a diagram illustrating the various circuit connections of the machine.

From the spacing-magnets the circuits extend to the impression magnet or helix $e^3$, before alluded to. As the last named magnet is located upon the top-frame $a$, and as it is sometimes desirable to remove this top-frame from the bed-plate in cleaning or adjusting the machine, I provide special devices for permitting the separation of the conductors and for automatically re-establishing the connections when the top-frame $a$, is returned to its place. These parts are plainly shown in Figs. 2, 4 and 21. The several conductors are laid through the base plate to the respective conducting fingers $d^{22}$, insulated from each other and fixed to a post on the bed-plate. They are made of elastic metal and grouped in such manner as to make contact with the converging conductors $d^{23}$, mounted on the top-frame. As the frame is placed in position the conductors $d^{23}$ are wedged between and make contact with the lower conductors as shown.

In order to adapt the machine for spacing between words and sentences, I provide means for operating the feed magnet $h^{11}$, and the several spacing magnets I I', &c., at will so as to advance the carriage a greater or less distance and thus produce spaces of variable width. These parts are shown in Figs. 1, 19, 20 and 22, in which J J' $J^2$ $J^3$, &c., represent a series of finger-keys, one for each of the spacing magnets, and one additional. All these keys connect at one end through the plate on which they are mounted, with the battery line. At the opposite end they all bear on a hinged conducting loop or frame, $j$, having at the middle a depending pin, $j'$, which acts to depress a head or lug of rubber or other insulating substance, $j^2$, underlying the table. Beneath the table a conductor, $j^3$, leading from a stop $h^{25}$, is conducted to a spring-arm $j^{12}$, normally in contact with a finger, $j^{13}$, connecting through conductor, $j^{14}$, with the impression magnet, $e^3$. Beneath the respective finger-keys there are a series of conducting pins, $j^{15}$, from which conducting wires $j^{16}$, lead through the respective spacing magnets I I' $I^2$, &c., to the battery. During the ordinary printing operation the printing circuit remains closed between $j^{12}$ and $j^{13}$. When, however, the spacing is to be effected without printing the finger key representing the appropriate space is depressed. Its first effect is through the frame $j$ and intermediate parts to depress the conductor $j^{12}$, and open the printing-circuit, after which the key making contact with its appropriate conductor $j^{15}$, completes the circuit through the conductor $j^{16}$, the main feed-magnet $h^{11}$, and the corresponding spacing magnet I or I', thereby causing the carriage to advance the required distance. It was before mentioned that the number of spacing keys is one greater than the number of space-controlling magnets. This is due to the fact that the additional key controls the main feed magnet alone for giving a half-inch space, in doing which the feed-lever $h^9$, is allowed its extreme movement without limitation from stop pins. The circuit through the main printing or impression magnet $e^3$ is normally open adjacent to the magnet in order that in printing the feed devices may act previous to the impression.

The automatic closing of the circuit through the impression magnet is effected by an overlying electro-magnet L, and circuit-closing devices operated thereby. The circuit through this upper magnet is controlled by a vibrating conductor $l$ on the end of the feed lever $h^{10}$. These parts are constructed in the same manner as in the former machine and need not therefore be described in detail herein, with the exception of the single feature represented in Fig. 7, which shows a device for holding open the circuit of the impression magnet in which $l'$ represents the armature of the magnet L, provided with a lip, $l^2$, to engage a shoulder, $l^3$, on a rod, $l^4$, attached to the circuit-closing device $l^5$. In the original machine the rod $l$ was extended loosely through a hole in the armature which acted thereon with a biting or frictional effect to hold it. The substitution of the lip and shoulder herein shown is advantageous in that it secures a positive action of the parts.

It will be manifest to the skilled mechanic that the bar $b^{17}$ may be replaced by another movable support for the dog $b^{16}$, and that the bars $h^{17}$ and $h^{18}$ may be replaced by other devices for disengaging the pawl $h^7$, various equivalent devices for similar purposes being well-known.

No claim is herein made to the system of magnet circuits and co-operating parts for effecting the feeding of the carriage; nor to the separable key board and its general features of construction; nor do I broadly claim the spacing mechanism, or the devices whereby the paper or matrix carriage feeding devices are caused to move said carriage without operating the impression mechanism.

Having thus described my invention, what I claim is—

1. The lever provided with type at one end and with a handle or finger-piece at the other, in combination with the single sustaining-arm sustained at one end by a vertical axis and connected at the other end to the middle of the lever by a vertical pivot: whereby the operator is enabled by moving the handle to carry the type horizontally in all directions and without restriction.

2. The movable paper carriage provided with a surface to sustain the sheet, and with side lips to overlap and confine the edges of the sheet, in combination with the shaft mounted in the carriage and provided with the two toothed wheels engaging the edges of the sheet to advance the same on the carriage.

3. The traveling paper carriage provided with paper-sustaining surfaces, and side lips to overlap and confine the edges of the paper, in combination with the shaft located beneath the paper space and provided with two toothed feed wheels beneath the confining lips.

4. In combination with an indenting mechanism, the paper-sustaining carriage and mechanism for advancing the same step by step in the direction of the length of the lines, the lips to confine the paper in flat form on the carriage, the toothed feed wheels mounted in the carriage to advance the paper thereon, their shaft and its pinion, the shaft $b^{10}$ geared thereto, its ratchet wheel, the pawl-carrying arm on said shaft, and a stop to actuate said arm when the carriage is retracted.

5. In combination with the reciprocating carriage having the separable portion, a paper feeding mechanism on said portion including an actuating lever, and the beveled yielding stop to actuate said lever: whereby the removal and return of the separable portion is permitted without changing the position of the paper thereon.

6. The traveling paper carriage with lips or guides to hold the sheet in flat form thereon, the toothed wheels mounted in the carriage and engaging the edges of the sheet to slide the same forward upon the carriage, the shaft for said wheels, the second shaft geared thereto and provided with the ratchet wheel, the pawl-carrying arm mounted on the second shaft, and the adjustable stop mounted on the main frame to abut against said arm, said elements combined substantially as shown.

7. The reciprocating paper carriage and its paper feed, mechanism including the pawl-carrying lever to actuate the same, in combination with the lever-actuating dog, the adjustable stepped bar mounted on the main frame and sustaining the dog, the stop to engage the steps of the bar and means to lock the bar in position: whereby the position of the dog may be speedily and definitely adjusted to vary the distance between the lines.

8. The paper sustaining carriage and the feed mechanism for advancing the same, in combination with the bar $g^2$, provided with a handle, $g^3$, by which to control the carriage and with cog teeth, the shaft mounted in the frame and provided with the pinion $g'$, and the graduated wheel G, and the stationary arm or pointer adjacent to said wheel.

9. In a matrix machine having the keyboard and the feed mechanism on opposite sides of the indenting mechanism, the sliding carriage and means for urging the same constantly forward, its rack-bar, the pinion engaging the bar, the toothed feed wheel, the vibratory lever $h^{10}$, its retracting spring, the arm $h^9$, pivoted to said lever and provided with a tooth to engage the wheel, the pawl $h^7$, arranged to engage the wheel, and to be disengaged by lever $h^{10}$, the hand-rod $g^2$, extending from the carriage to a point near the key-board, and the rod $h^{17}$, connected to pawl $h^7$, and extending thence to a point near the key-board: whereby the operator is enabled to control the distant feed mechanism and the carriage, and to adjust the latter at will from the front of the machine.

10. The combination with a matrix material carriage under tension of a rack provided with a projection, an escapement for said carriage in gear with said rack, and a movable stop or dog for said escapement, adapted to be operated by said projection, substantially as described.

11. The combination with a matrix material carriage and a spring impelling it in one direction, of a rack for said carriage having a rigid arm or projection, an escapement-wheel geared with said rack, and a movable stop or dog having a projection in the path of the projection on the rack for stopping the escapement wheel at a predetermined point of its return movement, substantially as described.

12. In combination with the paper-carriage, its rack-bar and the feed-wheel geared to the rack-bar, the movable stop actuated by the rack-bar, and engaging the feed-wheel to limit the retrogression of the carriage.

13. The combination in an electro-matrix machine with a spacing device, a circuit therefor, an impressive device and a circuit therefor, of a normally closed circuit controller in the circuit of the impressive device, a movable bar or bail adapted to open the said circuit controller, and keys mounted independently of said bar or bail and adapted to actuate the same, each of said keys being adapted to close the circuit to cause the movement of the matrix carriage through a different distance, substantially as described.

14. The combination in an electro-matrix machine with a spacing device, a circuit therefor, an impressive device and a circuit therefor, of a normally closed circuit controller in the circuit of the impressive device, a pivoted bail, a sliding rod between said bail and the circuit controller, and pivoted keys mounted independently of the said bail, each key being adapted to depress the bail and close the circuit for feeding the matrix carriage a different distance, substantially as described.

15. In a matrix machine a matrix carriage having a movement in the direction of the lines of impressions, a removable matrix supporting frame mounted therein and feed devices carried by the removable frame, for moving a matrix strip transverse to the direction of the carriage movement, substantially as set forth.

16. In a matrix machine the combination of a matrix carriage formed or provided with guides, a matrix strip supporting frame mounted on the carriage and adapted to slide in the guides, and a feed mechanism for the matrix strips carried by the supporting frame.

17. The combination with a matrix carriage, the matrix frame mounted and movable therein, and a matrix strip supported and guided in the latter, of the feed devices carried by said matrix frame consisting of toothed feed wheels, their shafts, the operating lever and its pawl, as set forth.

18. In a matrix machine the combination of a series of movable type dies arranged to be successively brought to a common impression point, a carriage movable laterally with respect to the impression point, an anvil and a matrix supporting frame removably attached to the carriage, substantially as set forth.

19. In a matrix machine the combination of a series of type dies movable laterally with respect to a common impression point, an impression device, a carriage movable in guides transversely of the impression point, and beneath the type dies, an anvil, and a matrix supporting frame carrying matrix feeding devices and detachably applied to the movable carriage, as set forth.

20. In a matrix making machine the combination of a series of type dies, movable with respect to a common impression point, a carriage movable laterally with respect to the impression point, an anvil, and a matrix supporting frame provided with lips along its side edges for confining a matrix strip, and a matrix strip feeding device, said matrix frame being removably attached to the carriage with its sides transverse to the direction of movement of the carriage, substantially as set forth.

In testimony whereof I hereunto set my hand, this 22d day of January, 1889, in the presence of two attesting witnesses.

CHARLES L. TRAVIS.

Witnesses:
PHIL T. DODGE,
W. R. KENNEDY.